No. 671,585. Patented Apr. 9, 1901.
J. COOMBER.
VEHICLE TIRE.
(Application filed Sept. 4, 1900.)
(No Model.)
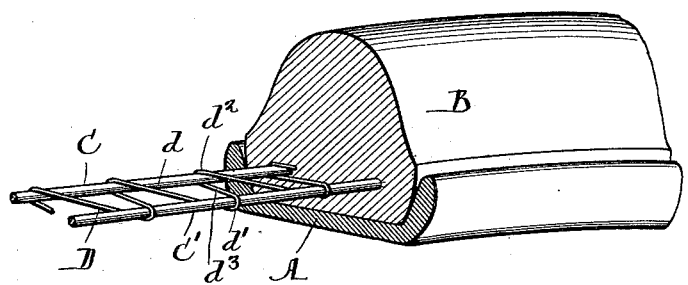
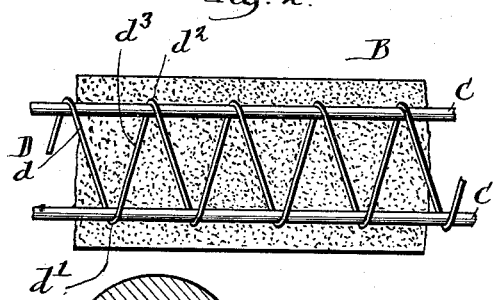
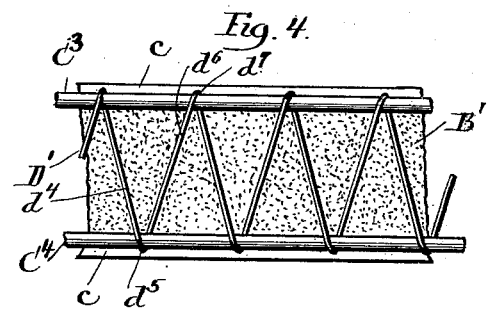
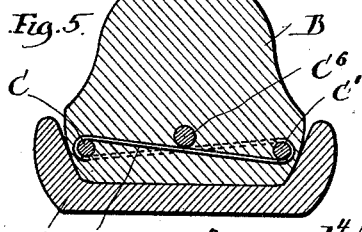
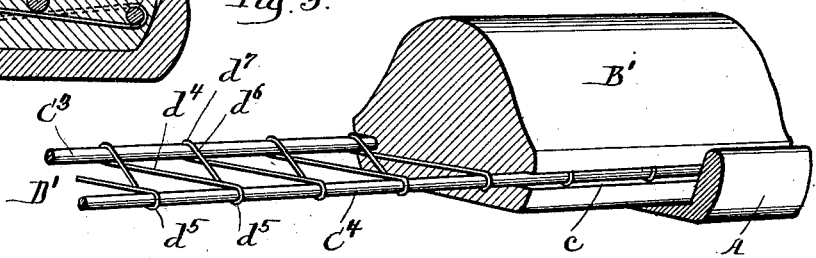
Witnesses:
Inventor:
James Coomber
By Fred Gerlach
his Attorney.

UNITED STATES PATENT OFFICE.

JAMES COOMBER, OF CHICAGO, ILLINOIS, ASSIGNOR TO THE WEMAKA RUBBER TIRE COMPANY, OF SAME PLACE.

VEHICLE-TIRE.

SPECIFICATION forming part of Letters Patent No. 671,585, dated April 9, 1901.

Application filed September 4, 1900. Serial No. 28,860. (No model.)

*To all whom it may concern:*

Be it known that I, JAMES COOMBER, a resident of Chicago, in the county of Cook and State of Illinois, have invented certain new and useful Improvements in Vehicle-Tires, of which the following is a specification.

The invention relates to the class of vehicle-tires commonly known as "cushion-tires"— *i. e.*, those in which an elastic strip or body is employed.

It is now common practice to employ longitudinal retaining-bands to secure an elastic strip in a channeled metallic rim. It has also been proposed to employ metallic cross stays or supports for the retaining-bands. In applying an elastic strip to a wheel it is customary to compress the elastic strip along the retaining-band to expose the ends of the bands, so these can be joined or secured together, and also to give the desired compactness to the rubber strip when in a circular rim.

The present invention designs to provide an improved construction of cross-support for the retaining-bands which can be formed from a strip of metal, preferably wire, and which can be made of extended length or continuous throughout the elastic strip, if desired, and none the less permit the strip to be compressed longitudinally for the purposes already described.

With this object in view the invention consists, primarily, in embedding a cross-support formed of a strip of metal extended back and forth across the elastic strip around the bands to provide a transverse connection therebetween and continuously along the bands and throughout the elastic strip.

The invention further consists in extending such strip back and forth and alternately over and under the bands, thence around the bands, and continuously through the elastic strip.

The invention further designs to provide a tire having open bores or grooves in the sides thereof, with a cross-support extended to secure the retaining-bands in proper position in the bores or grooves.

The invention further consists in combining such forms of cross-supports with an elastic strip having open bores or grooves in its sides; and, lastly, the invention consists in the several novel features of construction hereinafter described, illustrated in the accompanying drawings, and more particularly defined by claims at the conclusion hereof.

In the drawings, Figure 1 is a perspective view of a portion of a tire embodying one form of the invention. Fig. 2 is a view in horizontal section. Fig. 3 is a perspective of a portion of a tire, showing another form of the invention. Fig. 4 is a view in horizontal section thereof. Fig. 5 is a transverse section of a modified form of the invention.

A denotes a metallic rim having flanges between which a channel is formed. B is an elastic strip of suitable shape to fit within said channeled rim and having bores extended longitudinally therethrough, wherein are held retaining wires or bands C and C'.

D is a cross-support for the retaining-bands, formed of a strip of wire comprising portions or bars $d$, extended through and diagonally across the rubber, thence under and around band C, as at $d^5$, thence through and diagonally across the rubber, as at $d^3$, and thence under and around band C', as at $d^2$. Such form and arrangement are continued throughout the length of the rubber strip. Such construction provides a cross-support for the retaining-bands, secures the bands against lateral movement in the elastic body, and permits the elastic strip to be compressed to a certain extent and sufficiently to expose the terminals of the bands, so these can be secured or joined together and compressed, so the elastic strip when seated in the rim-channel will possess the desired compactness. An important resultant advantage of the invention is that the cross-support, being of considerable length, will be firmly held by the cores which form the longitudinal bores when the elastic strip is being molded, and so the cross-supports will be truly and uniformly disposed in the strip. By employing a continuous or extended strip of wire the cross-supports can be bent and formed by rolls or dies with little expense. The cross-support may be formed of sections of convenient length or may be continuous throughout the entire strip.

In some instances it is desired to employ open bores or grooves in the sides of the elastic strip, wherein the retaining-bands will be extended. Such a construction is shown in Figs. 3 and 4. B' is an elastic strip of suitable form to fit within the channel in rim A and has open bores or grooves $c$ formed in its sides to receive the retaining-bands. A cross-support D', similar to that already described, consists of bars or portions $d^4$, extending diagonally—i. e., laterally and transversely—across the rubber, thence around retaining-band $C^4$, as at $d^5$, thence diagonally across the rubber, as at $d^6$, thence around retaining-band $C^3$, as at $d^7$, and so on throughout the strip or to form supports of convenient length. An advantage in employing this form of cross-support for the bands in open bores is that the curved portions of the strip of wire which extend around the retaining-bands are exposed, thus permitting the cross-support to bend easily at these portions when the elastic strip is being compressed, and, furthermore, these curved portions prevent the wires from slipping sidewise out of the grooves. In Fig. 5 there is shown a tire in which an additional retaining-band $C^6$ is superposed upon the cross-support.

The invention, so far as I am aware, is the first in the art in which the cross-supports have been formed in such manner that these would securely retain the bands in an open bore or grooves.

Manifestly the invention is not to be understood to be restricted to the form and construction shown and described, since these may be modified by the skilled mechanic without departing from the spirit of the invention. For example, any desired number of retaining-bands may be employed, according to the width of the tire. So, also, the features may be employed severally without their adoption in entirety.

Having thus described the invention, what I claim as new, and desire to secure by Letters Patent, is—

1. In a vehicle-tire the combination with a channeled rim, of an elastic body or strip, a plurality of longitudinal retaining-bands for securing said strip in said rim, and a metallic strip comprising a series of portions extended transversely and longitudinally through the elastic strip and extended also around said retaining-bands.

2. In a vehicle-tire the combination with a channeled rim, of an elastic body or strip, a plurality of longitudinal retaining-bands for securing said strip in said rim, and a metallic strip comprising a series of portions extended continuously back and forth and longitudinally through the elastic strip and extended also around said retaining-bands.

3. In a vehicle-tire the combination with a channeled rim, of an elastic body or strip, a plurality of longitudinal retaining-bands for securing said strip in said rim, and a metallic strip comprising a series of portions extended transversely and longitudinally through the elastic strip and extended also around and alternately above and below said retaining-bands.

4. In a vehicle-tire the combination with a channeled rim, of an elastic body or strip, a plurality of longitudinal retaining-bands for securing said strip in said rim, and a metallic strip comprising a series of portions extended continuously back and forth and longitudinally through the elastic strip, around and alternately above and beneath said retaining-bands.

5. In a vehicle-tire, the combination with a channeled rim, of an elastic body or strip within said rim, having open longitudinally-extending bores or grooves formed therein, retaining-bands in said bores or grooves and a cross-support for said bands formed to secure said bands against outward movement in said bores or grooves.

6. In a vehicle-tire, the combination with a channeled rim, of an elastic body or strip within said rim, having open longitudinally-extending bores or grooves formed therein, retaining-bands in said bores or grooves and a cross-support for said bands extended between said bands and formed to secure said band against outward movement in said bores or grooves.

7. In a vehicle-tire, the combination with a channeled rim, of an elastic body or strip within said rim, having open longitudinally-extending bores or grooves formed therein, retaining-bands in said bores or grooves and a cross-support for said bands extended across the elastic strip and around said bands.

8. In a vehicle-tire, the combination with a channeled rim, of an elastic body or strip within said rim, having open longitudinally-extending bores or grooves formed therein, retaining-bands in said bores or grooves and a cross-support for said bands formed of a metallic strip bent to form a continuous series of portions extending back and forth across the elastic strip and around said retaining-bands.

9. In a vehicle-tire, the combination with a channeled rim, of an elastic body or strip within said rim, having open longitudinally-extending bores or grooves formed therein, retaining-bands in said bores or grooves and a cross-support for said bands formed of a metallic strip bent to form a series of portions extending back and forth, longitudinally and across the elastic strip and around the retaining-bands.

10. In a vehicle-tire, the combination with a channeled rim, of an elastic body or strip within said rim, having open longitudinally-extending bores or grooves formed therein, retaining-bands in said bores or grooves and a cross-support for said bands formed of a metallic strip bent to form a series of portions extending back and forth, longitudinally and across the elastic strip around and alternately above and beneath the retaining-bands.

JAMES COOMBER.

Witnesses:
 FRED GERLACH,
 JAMES WILSON.